(12) United States Patent
Mohr (10) Patent No.: US 6,722,659 B2
(45) Date of Patent: Apr. 20, 2004

(54) SHAFT SEAL (75) Inventor: Christian Mohr, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/064,748

(22) Filed: Aug. 13, 2002

(65) Prior Publication Data
US 2003/0030227 A1 Feb. 13, 2003

(30) Foreign Application Priority Data
Aug. 13, 2001 (EP) .............................. 01119440

(51) Int. Cl.7 ................................. F16J 15/32
(52) U.S. Cl. ...................................... 277/560
(58) Field of Search ................. 277/560, 552, 277/559

(56) References Cited
U.S. PATENT DOCUMENTS
3,214,179 A * 10/1965 Dega ........................ 277/309
3,895,814 A * 7/1975 Kupfert et al. ............. 277/559

FOREIGN PATENT DOCUMENTS
DE  19831523  2/2000
DE  19839485  3/2000
DE  19949205  4/2000

* cited by examiner

Primary Examiner—William L. Miller
(74) Attorney, Agent, or Firm—Diana D. Brehob (57) ABSTRACT A shaft seal, which is pre-stressed by a spring, has a main body element and a projection, which is adjacent thereto. The projection is designed as a sacrificial element which, when the seal is used correctly, abrades because of the friction with the opposite surface and, in the process, polishes the opposite surface. The radial cross-sectional profile of the projection is selected in so that the sealing-lip supporting surface is not substantially enlarged with increasing abrasion of the projection, thereby a predetermined surface pressure at the sealing-lip supporting surface of the projection is essentially maintained over the service life of the seal.

18 Claims, 4 Drawing Sheets

Prior art

Prior art

Prior art

SHAFT SEAL

BACKGROUND OF INVENTION

1. Field of the Invention

The present invention relates to a shaft seal, arranged between a shaft and a housing, having at least one sealing lip which bears with a sealing-lip supporting surface against the shaft surface moving relative to the seal. A predetermined surface pressure is applied to the sealing lip and shaft surface interface by a pre-stressing element.

2. Background and Summary of the Invention

In the prior art, a multitude of sealing arrangements for providing a seal between two components moving relative to each other has been disclosed. The sealing arrangement seals spaces containing different media or pressure conditions-from each other.

Figure 1:
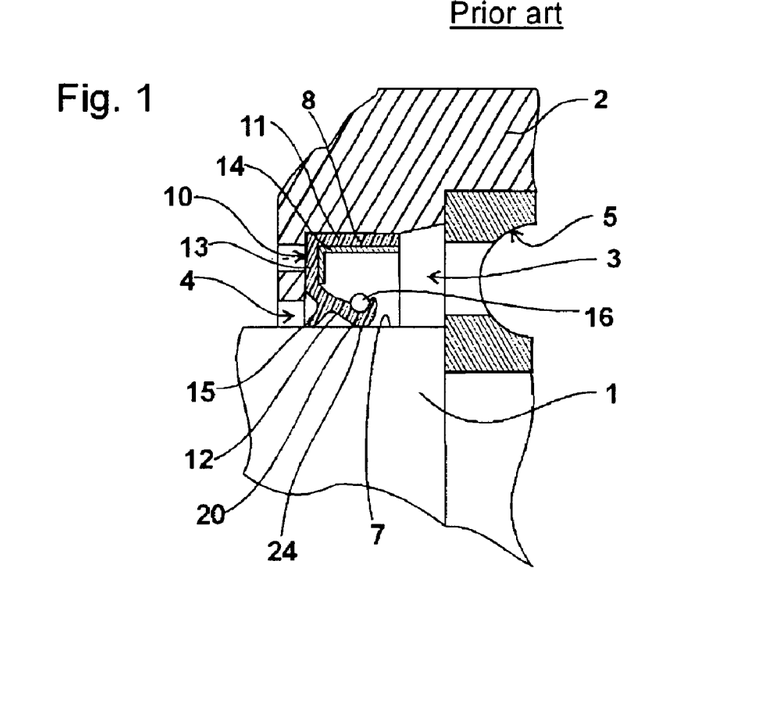
FIG. 1 is a partial cutaway view of an example of the use of a shaft seal according to the prior art.

FIG. 1 shows diagrammatically, by way of example, such a sealing arrangement according to the prior art used in a field of use, which is frequently encountered. In the case illustrated, a gap between a shaft 1 and a housing part 2 is shown, through which shaft 1, rotating relative to the housing 2, is guided. These are to be sealed in such a manner that a medium contained in a space 3 cannot pass into a space 4, and vice versa. Arranged in space 3 is a shaft bearing 5, for example a grooved ball bearing, which supports shaft 1 in the opening of the housing 2 and is lubricated by a suitable lubricant. In contrast, space 4 is exposed to environmental influences and so spray water and dirt can pass into it, the intention being to prevent them from entering into space 3.

To mutually seal spaces 3 and 4, there is provided in the gap, which is defined by a shaft surface 7 and a surface 8 of the housing 2, a shaft seal. Shaft seal 10 consists of an elastomeric sealing material and has essentially a U-shaped cross-sectional configuration. A first limb 11 of the shaft seal 10 bears in a sealing manner against surface 8 of housing 2 and is secured thereon—for example, by means of compression. A second limb 12 is in sealing contact with shaft surface 7. First and second limbs 11 and 12, respectively, are connected to each other by a base section 13. Furthermore, an L-shaped stiffening element is provided for reinforcing first limb 11 and base section 13. In addition, shaft seal 10, according to FIG. 1, has a protective lip 15 which is arranged at that end of second limb 12 which is adjacent to base section 13, and comes to bear against shaft surface 7.

Second limb 12 bears with its outer end against shaft surface 7 at a predetermined contact pressure force, with the result that shaft surface 7 can rotate relative to shaft seal 10 and can also move in the axial direction. The contact pressure force is determined by the restoring force, which depends on the elastic properties of the seal material and the pre-stressing of second limb 12 with respect to shaft surface 7, and/or by the tangential force of a helical tension spring 16 which is inserted into shaft seal 10 at the outer end of second limb 12 and presses the outer end of second limb 12 against shaft surface 7 with a predetermined force.

Figure 2:
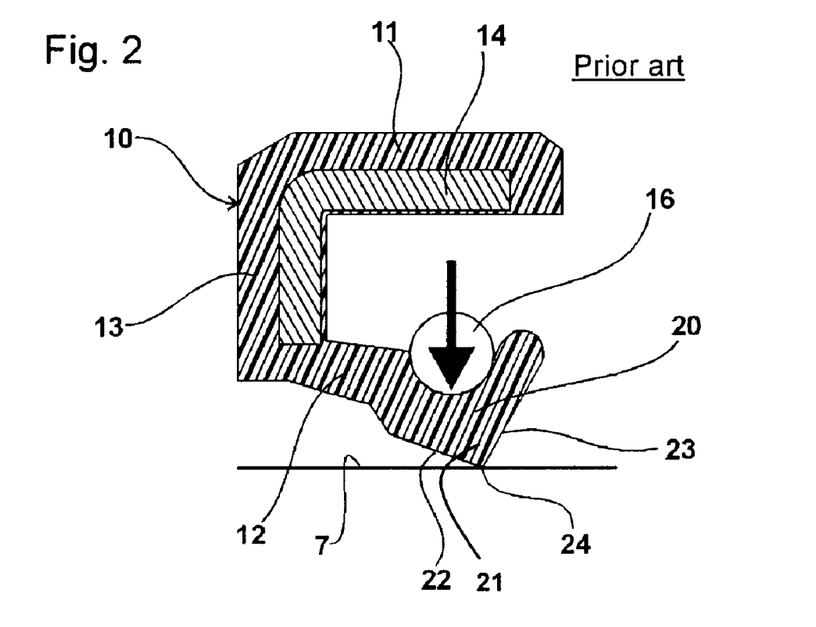
FIG. 2 is an enlarged sectional view of the shaft seal FIG. 1, according to prior art.

A variant of shaft seal 10 according to FIG. 1, in which a protective lip 15 is not provided, is illustrated in cross section on an enlarged scale in FIG. 2. In particular, a sealing lip 20, formed at the outer end of second limb 12, can be seen in FIG. 2.

A body element 21 of sealing lip 20 is defined by two side surfaces 22 and 23 tapering toward each other. Body element 21 has an essentially triangular cross section, against which spring 16 presses, as is indicated by an arrow in FIG. 2. At the tip of body element 21, sealing lip 20 bears with an annular, relatively narrow sealing-lip supporting surface 24 against shaft surface 7.

Grinding seals of this type, such as shaft seal 10 described above, provide a reliable seal, particularly if the wear of sealing lip 20 is small on account of the surface quality of the shaft surface 7 and/or on account of the lubrication of the sealing edge or sealing-lip supporting surface 24. In contrast, increased friction of the seal on opposite surface 7 has a disadvantageous effect on account of the temperature increase associated therewith and the effects of wear caused as a result. The wear leads to a reduced sealing action of shaft seal 10, which, as will be explained in greater detail with reference to FIGS. 3A to 3C, 4 and 5, depends substantially on the surface pressure at sealing-lip supporting surface 24.

Figure 3A:
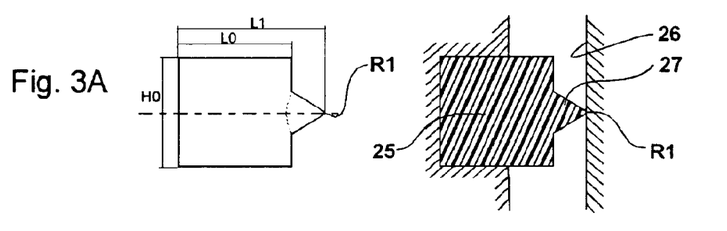
FIGS. 3A, 3B and 3C show profiles of sealing lips with different point radii.
Figure 3B:
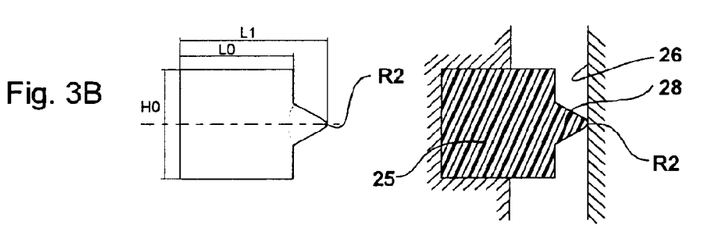
Figure 3C:
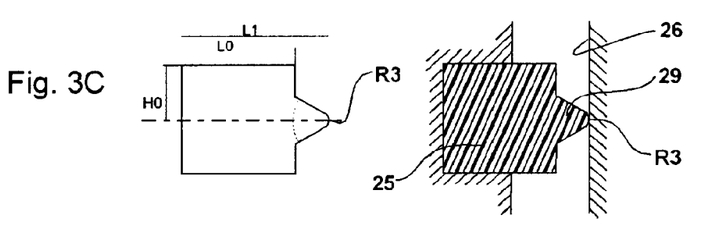

FIGS. 3A, 3B and 3C each illustrate profiles of sealing lips 27, 28 and 29, which are arranged on a sealing body 25, bearing against an opposite surface 26. They differ in "sharpness". These profiles have been used for the measurements illustrated in FIGS. 4 and 5. The profiles of FIGS. 3A, 3B and 3C differ in each case merely by the different point radii R1, R2 and R3 of sealing lips 27, 28 and 29, respectively. Sealing lip 27, according to FIG. 3A, has a point radius R1=0.1 mm; sealing lip 28, according to FIG. 3B, has a point radius of R2=0.2 mm; and, sealing lip 29, according to FIG. 3C, has a point radius of R3=0.3 mm. The remaining parameters of the profiles: the rectangular cross-sectional shape of sealing body 25 with a height HO and a length LO, the overall length L1, the 30° angle with respect to the axis of symmetry of the side surfaces 22 and 23 of the sealing lips, and the sealing materials are essentially identical for all of the profiles of FIGS. 3A to 3C.

Figure 4:
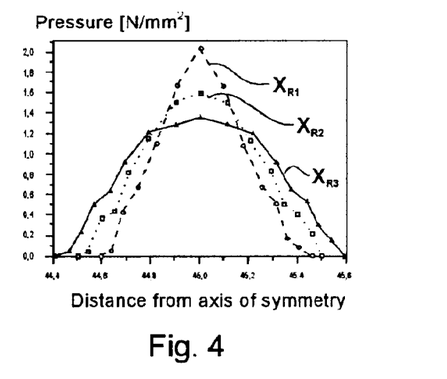
FIG. 4 is a graph representing the distribution of the surface pressures in the sealing gap for the profiles according to FIGS. 3A, 3B and 3C.
Figure 5:
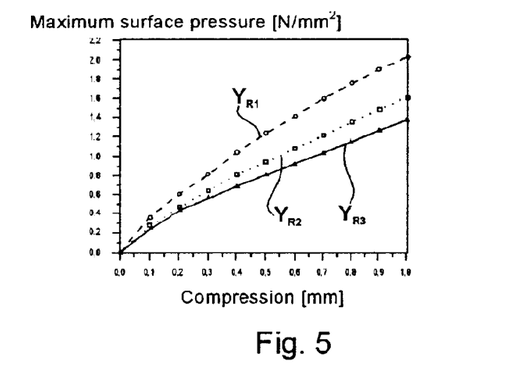
FIG. 5 is a graph representing the relationship of the surface pressure with increasing compression of the profiles according to FIGS. 3A, 3B and 3C.

FIG. 4 shows the distributions of the surface pressures in the sealing gap $X_{R1}$, $X_{R2}$ and $X_{R3}$ for the different point radii R1, R2 and R3, respectively. FIG. 5 illustrates the rise in the maximum value of the surface pressure in the sealing gap $Y_{R1}$, $Y_{R2}$ and $Y_{R3}$ for the point radii R1, R2 and R3, respectively, as a function of compression distance.

The curves according to FIGS. 4 and 5 show a marked dependence of the surface pressure in the sealing gap on the point radius, the maximum value of the surface pressure decreasing with increasing point radius R1→R2→R3. In the case of relatively small point radii, a relatively large surface pressure is obtained. Accordingly, sealing action improves with the geometry otherwise unchanged. Laboratory tests also show that the sealing lips having the smallest point radii have the highest seal tightness. It should also be noted that the variants having the smallest point radii achieve the greatest surface pressures with, at the same time, the smallest reaction forces.

In summary, it follows from this that seal tightness of a sealing arrangement having a resilient sealing material depends substantially on the surface pressure in the sealing gap, which in turn depends on the "sharpness" of the sealing lip and the contact pressure force.

The wear of sealing lip 20, which influences the surface pressure of sealing-lip supporting surface 24, is therefore critical to the service life of the sealing arrangement or shaft seal 10. The wear depends on the relative speed of sealing lip 20 with respect its respective shaft surface 7, on the roughness of shaft surface 7 bearing against sealing lip 20, and on the wear properties of the sealing material.

The roughness of shaft surface 7 is reduced over time by sealing lip 20 rubbing against it, since the sealing lip grinds in a running surface on shaft 1. Even after a short running time, sealing lip 20 produces a finely polished region on shaft surface 7. Subsequently, sealing lip 20 is subject to a greatly reduced wear or virtually no at all. In the case of structures with small axial relative displacements of shaft surface 7, this region is very narrow. A structure of this type can be achieved if, for example, shaft seal 10 on shaft 1 is situated directly next to a fixed shaft bearing, such as, for example, a tapered roller bearing.

In the case of structures in which shaft seal 10 on shaft 1 is far away from a fixed bearing of a fixed/moveable bearing arrangement, a relative displacement between shaft 1 and shaft seal 10 in the axial direction of shaft 1 may occur. On account of different coefficients of thermal expansion of the shaft material and the housing material, axial relative displacements occur in the case of changing external temperatures during warm-up operation. Furthermore, axial relative displacements between shaft 1 and shaft seal 10 are caused by axial forces, which can arise due to intermeshing. These axial forces cause deformation of the housing and of the bearing cover and the bearing plate of a shaft bearing and thus also deformation between shaft seal 10 and a fixed bearing. This has a disadvantageous effect on the sealing arrangement since the deformation leads to axial displacement of the running surface of sealing lip 20 on shaft 1.

Such axial displacement of shaft 1 causes the running surface of sealing-lip supporting surface 24 on shaft surface 7 to change, with the result that sealing lip 20 is constantly in frictional contact with various circumferential points of shaft surface 7. This has the result that, in comparison to a structure without significant axial displacement of shaft 1, a substantially larger region of shaft surface 7 has to be ground in.

An axial relative movement between sealing lip 20 and shaft 1 causes increased wear as a function of the magnitude and frequency of the axial displacement. As a consequence of such wear, a completely rounded, worn contour of an originally pointed sealing lip can arise, as illustrated in FIG. 6.

Figure 6:
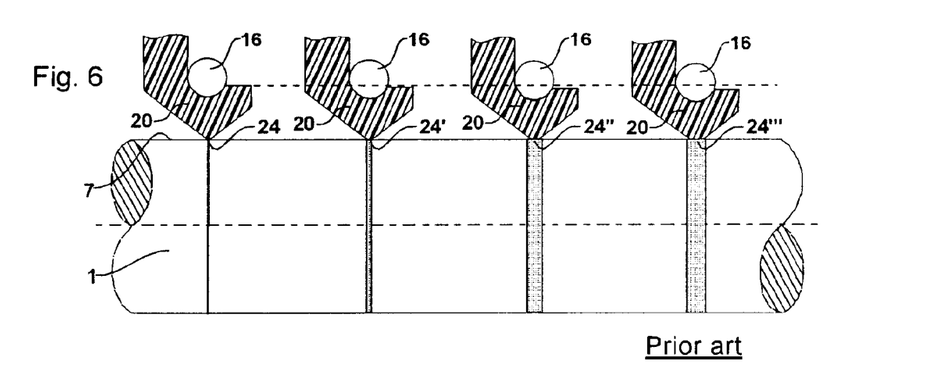
FIG. 6 is a sectional illustration of a sealing lip according to the prior art which bears on a shaft, in various states of wear.

FIG. 6 shows, from left to right, various states I, II, III and IV of sealing lip 20.

State I refers to sealing lip 20 when new, with an originally pointed sealing-lip supporting surface 24. The narrow region on shaft 1 is polished by sealing-lip supporting surface 24 and is indicated by a line in FIG. 6. State II shows sealing lip 20 with a sealing-lip supporting surface 24', said lip having already been worn to a certain extent without there being axial play of shaft The region polished by the sealing lip 20 corresponds essentially to the width of sealing-lip supporting surface 24'.

When there is axial play of the shaft 1, after a short running time, state III arises in which a sealing supporting surface 24" has formed. The region polished by sealing 20 is indicated on the shaft 1 and is wider than sealing-lip supporting surface 24".

This region is wider because of the axial play of shaft 1. This is associated with a relatively pronounced wear or relatively pronounced widening of the originally pointed sealing-lip supporting surface 24 (state 1). After a long running time state IV finally arises, in which the wear of sealing lip 20 has produced a greatly widened sealing-lip supporting surface 24'''. The region polished by sealing lip 20 is wider than sealing-lip supporting surface 24'''.

The seal tightness of the sealing arrangement is disadvantageously affected in going from I→II→III→IV in two respects: firstly, there is enlargement of sealing supporting surface 24→24"→24'''. Secondly, the material thickness of sealing lip 20 is reduced perpendicular with respect to the sealing-lip supporting surface (indicated in FIG. 6 by means of a dashed line parallel to shaft surface 7), as a result of which the contact pressure force produced by the elasticity of the sealing-lip material and by the pre-stressing of spring 16 is reduced. The consequence of this is a pronounced loss of surface pressure and therefore of seal tightness.

The wear also depends on supplying the contact point with lubricant. For this purpose, the opposite running surface or shaft surface 7 is generally greased in advance. However, during installation of shaft seal 10 or of shaft 1 the grease is wiped away, with only a small amount of grease remaining, for example, in the chamber between protective lip 15 and sealing lip 20 in FIG. 1. Furthermore, the lubricating grease is increasingly pushed to the outside from the region of the contact surface or running surface of shaft seal 10 by a constant axial movement.

In the prior art, it is known to polish opposite surface 7, against which sealing lip 20 bears, to reduce the surface roughness to reduce wear of sealing lip 20. The sealing lip then no longer has to ensure a corresponding grinding-in process. However, a surface treatment of this type is subject to process fluctuations and requires additional machining time and increased costs.

Another known approach is avoidance of combined rotational and linear movement in the sealing region. For example, DE 198 39 485 A1 discloses a sealing arrangement in which a sealing lip bears against a sleeve rotating together with the shaft. In the event of axial movement, the seal is carried along via a bearing to the shaft, with the result that the running surface of the sealing lips on the sleeve does not change. However, a structure of this type is very complex and requires the shaft bearing to be connected to the seal. Thus, the actual seal cannot be used independently of the shaft bearing.

DE 198 31 523 A1 discloses a further possibility of avoiding at least small axial movements of an opposite surface relative to a sealing lip. An axial projection, which has the sealing lip, on a sealing body, is pre-stressed in the axial direction by means of a compression spring which is arranged between the sealing body and a stop situated opposite the latter. The axial compression spring is intended to absorb high-frequency, small-amplitude oscillations of the opposite surface in the axial direction without relative movement between the sealing lip and the opposite surface. However, the costs of the seal are significantly increased by the additional, axial compression spring.

It is also known to treat the surface of the sealing lip to reduce friction as disclosed, for example, in DE 199 49 205 A1, in which treatment of a moveably arranged sealing-lip surface with halogens is described.

Furthermore, it is known in the prior art to coat the sealing lip with a friction-reducing material. DE 198 39 502 A2 shows, for example, a sealing lip coated with PTFE.

However, reducing the friction of the sealing lip, according to the prior art, requires coating of or a hardening treatment of the sealing-lip material. Both processes increase production costs of the seal. Moreover, the coating may become detached from the base material of the sealing lip. Furthermore, a hardening treatment is subject to process-induced fluctuations in quality.

Drawbacks of prior approaches are overcome by a shaft seal with at least one sealing lip which bears with a sealing-lip supporting surface against an opposite surface moving relative to the seal at a predetermined surface pressure applied by a pre-stressing element. The sealing lip has a main body element and at least one projection, which is supported by and adjacent to the main body element. The projection bears against the opposite surface and is a sacrificial element, which abrades due to friction with the opposite surface. In the process, the projection polishes the opposite surface. The radial cross-sectional profile of the projection is such that the sealing-lip supporting surface is not substantially enlarged by abrasion thereby maintaining a predetermined surface pressure at the sealing-lip surface of the projection over a service life of the seal.

An advantage of the present invention is that because the sealing-lip supporting surface does substantially enlarge, the surface pressure does not diminish. Thus, over the life of the seal, seal tightness is maintained.

Yet another advantage of a seal, according to the present invention, is that relatively small demands can be placed on the opposite surface moving relative to the seal or on the running surface of the seal. Because of the shape of the projection, some axial movement can be tolerated.

Another advantage of the present invention is that it is inexpensive to produce. The opposite surface need not be polished to such a high degree as prior systems. The application of a lubricating material is also not critical to the seal.

The invention makes provision for the projection to be a sacrificial element, which abrades due to friction with the opposite surface. In the process, the projection polishes the opposite surface. In this case, the radial cross-sectional profile of the projection is selected in such a manner that the sealing-lip supporting surface is not substantially enlarged with increasing abrasion of the projection. Thus, a predetermined surface pressure at the sealing-lip supporting surface of the projection is essentially maintained over the service life of the seal. This means that the projection is of rather more pointed design in comparison with the main body element. In contrast, the main body element is of such a design—is preferably wider that the projection is supported and thus protected against lateral movement.

An essential concept of the present invention therefore resides in recognizing that abrasion of the seal occurs and ensuring that the cross-sectional geometry due to abrasion causes a smaller enlargement of the sealing-lip supporting surface than is the case in prior art seals. As a result, the surface pressure remains essentially the same—apart from a slight decrease due to the abrasion-induced change in the seal radius, with the result—as explained above—that reliable sealing is ensured with long-term stability.

Preferably, the radial extent of the projection is selected so that abrasion of the projection over the service life of the seal essentially stops due decrease in friction on account of the increasingly more finely polished opposite surface. The precise dimension of the radial extent of the projection also depends, inter alia, on how much axial displacement between the seal and opposite surface are to be reckoned with and how long it takes until a sufficiently fine polish is achieved over the entire region of axial displacement. The longer the projection, the wider it should be to provide sufficient stability with respect to lateral movement. The radial extent of the main body element is preferably greater than the radial extent of the projection. This ensures that the main body element, with its relatively large volume, ensures the necessary stiffness of the sealing lip, thereby preventing lateral movement of the sealing lip.

The width profile of the seal can preferably be selected in such a manner that—if the seal is not yet abraded—the width in the region of the projection increases at increasing distance from the opposite surface to a smaller extent than the width in the region of the main body element increases at increasing distance. As a result, in this case the projection is of more pointed design than the main body element.

Alternatively, the projection can also have an essentially constant width or can even taper at increasing distance. It is particularly advantageous if the width of the projection decreases at increasing distance from the sealing-lip supporting surface. As a result, a loss in surface pressure due to a loss in material because of the decrease in the supporting surface of the sealing lip can is compensated. In addition, the opposite surface is ground smooth at the beginning to a relatively wide track, and so, in consequence, there is less wear of the sealing lip following the abrasion.

In an advantageous refinement, the main body element can have an essentially triangular cross-sectional configuration with two main side surfaces tapering toward the projection. In the case of such a construction of the sealing lip, the projection can simply be integrally formed on the main body element.

According to a further aspect, the sealing lip consists of an essentially elastic or resilient sealing material. Furthermore, the main body element and the projection are preferably designed as a single piece. Since the main body element has substantially more volume than the projection, the elasticity of the main body element essentially comes into play during the contact pressure force, and the contact pressure force decreases only negligibly during wear of the projection. Furthermore, such a construction of a sealing lip can be realized in an extremely simple manner for various sealing arrangements without additional components, coatings, or the like being required.

According to a further advantageous refinement of the invention, at least one of a grinding material is provided in the direction parallel to the sealing-lip supporting surface adjacent to at least the projection. A grinding material of this type assists or accelerates the grinding-in process, with the result that the opposite surface is polished more rapidly, thereby substantially stopping the abrasion of the sealing lip.

Furthermore, according to one embodiment, at least one layer of a supporting material can be provided in the direction parallel to the sealing-lip supporting surface adjacent to at least the projection, said supporting material preferably being softer than the sealing material, at least in the region of the projection. This prevents the sealing lip from moving laterally in the region of the projection. By virtue of the fact that the supporting material is softer, and therefore more elastic than the sealing material of the projection, the surface pressure is concentrated on the sealing-lip supporting region of the projection, with the result that the surface pressure is increased or maintained.

According to a further preferred refinement, the projection has at least one initial sealing lip with the sealing-lip supporting surface bearing against the opposite surface, and at least one additional sealing lip with an additional sealing-lip supporting surface spaced apart from the opposite surface. In this case, the opposite surface is first ground-in by the initial sealing lip. The additional sealing lip then comes into play after appropriate wear of the initial sealing lip. The sealing action of the sealing lip is improved on account of a smaller sealing-lip supporting surface of the additional sealing lip in comparison to the worn away initial sealing lip. To reinforce this effect, a plurality of additional sealing lips and/or a plurality of initial sealing lips may be provided.

In the case of a sealing arrangement having a sealing lip according to the invention, the sealing action can be maintained in spite of wear. In addition, the quality requirements which have to be met by the processing of the opposite surface to reduce the friction of the sealing lip on the opposite surface can be reduced, since, according to the invention, the sealing lip itself grinds in and polishes its running surface on account of a predetermined amount of initial wear. A seal according to the invention is therefore more robust with respect to tolerances during the processing or treatment of the opposite surface. Finally, the extended durability of the seal means that maintenance costs can be reduced.

The invention will be explained in greater detail below by way of example with reference to the figures, in which the same reference numbers are used in the figures for identical or essentially identical elements. In the figures:

BRIEF DESCRIPTION OF DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 7:
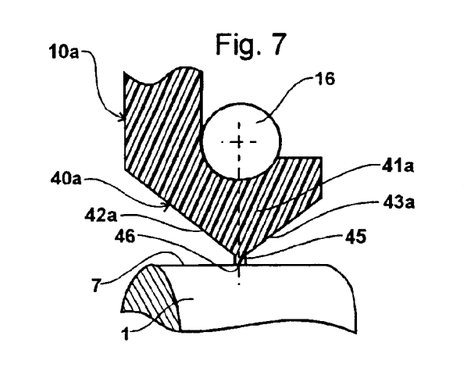
FIGS. 7 through 13 illustrate sectional views of exemplary embodiments of sealing lips according to the present invention.

FIG. 7 shows a sealing lip 40A, according to the present invention, of a first exemplary embodiment of a seal 10A. Sealing lip 40A is, like the sealing lip 20 of FIG. 2, pressed against the opposite surface or shaft surface 7 of a shaft 1, which rotates relative to the seal, by a helical tension spring 16. Other pre-stressing elements may also be used within the scope of the present invention. Alternatively, pre-stressing can be obtained merely by the elasticity of the rubber material with a spring 16 or the like being omitted.

Sealing lip 40a has a main body element 41a, which has an essentially triangular cross-sectional, and has two main side surfaces 42A and 43A tapering toward each other at an obtuse angle. Spring 16 produces a contact pressure force bearing against the base side of main body element 41a between main side surfaces 42a and 43a.

Opposite spring 16, a projection 45 is coupled to main body element 41a. Projection 45 bears with a sealing-lip supporting surface 46 against opposite surface Projection 45 and main body element 41a are formed as a single piece from a resilient sealing material. In addition to the contact pressure force produced by spring 16, part of the contact pressure force arises from the elastic deformation of the sealing-lip material, which is produced by compressing or deflecting the sealing-lip material.

Projection 45 can be formed together with main body element 41a in one working step by known seal-production processes. Alternatively, projection 45 can be formed on sealing lip 40a by removal of sealing-lip material.

The width of projection 45, as measured in the cross section of the sealing lip 40a parallel to the sealing-lip supporting surface 46, is constant. The width does not increase or decrease with increasing vertical distance from the sealing-lip supporting surface 46; whereas, the sealing lip 40a rapidly widens with increasing distance in the region of main body element 41a.

The vertical extent or height of the web-shaped projection 45 in relation to its width is selected so that projection 45 cannot move laterally due to the contact pressure force arising by means of spring 16 and the elasticity of the sealing-lip material.

Over the service life of seal 10a, sealing-lip supporting surface 46 does not substantially widen due to the wear occurring on opposite surface 7 due to abrasion. Only a slight decrease in the surface pressure, on account of the loss of the sealing-lip material in the region of projection 45, and of a reduced contact pressure force associated therewith, is to be expected.

Abrasion and, therefore, wear of sealing lip 40a is reduced with increased grinding in of the seal on opposite surface 7 and polishing of opposite surface 7 by means of sealing lip 40a. Projection 45, or a part of it, is sacrificed to polish the running surface of sealing lip 40a on opposite surface 7 for the purpose of reducing friction and wear, particularly when there is axial play of shaft 1. However, since sealing-lip supporting surface 46 remains essentially constant during this initial abrasion and the contact pressure force decreases only slightly owing to the small loss of material in the region of projection 45, sealing lip 40a essentially retains its surface pressure and therefore its sealing action. The durability of seal 10a is therefore increased as a whole.

Figure 8:
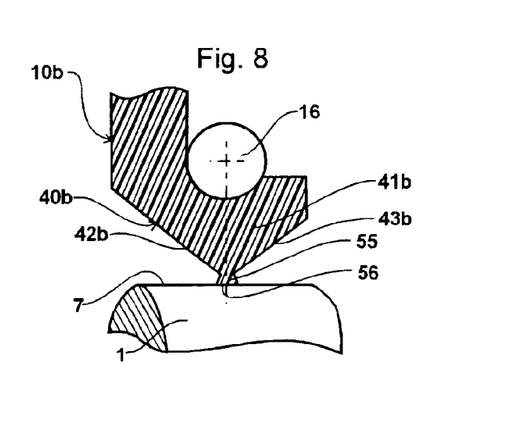

In the case of a further exemplary embodiment of a seal 10b, shown in FIG. 8, a sealing lip 40b, according to the invention, has a main body element 41b which primarily forms the volume of sealing lip 40b and has essentially a triangular cross section with two main side surfaces 42b and 43b tapering toward each other at an obtuse angle.

Opposite spring 16, which produces the contact pressure force, sealing lip 40b has a projection 55, which is adjacent to the main body element 41b. Projection 55 is of wedge-shaped design and widens as a function of distance from main body element 41b.

During abrasion of sealing lip 40b, sealing-lip supporting surface 56 is therefore reduced, with the result that a reduction of the surface pressure, which reduction is based on the loss of material, can be compensated for by sealing lip 40b, which becomes sharper due to abrasion. Sealing-lip supporting surface 56, which is wider at the initially, causes the running surface of sealing lip 40b on opposite side 7 to be ground in, particularly when there is axial play of shaft 1, over a wider track than required by the sealing lip which has been made narrower due to the abrasion in the region of the projection.

Figure 9:
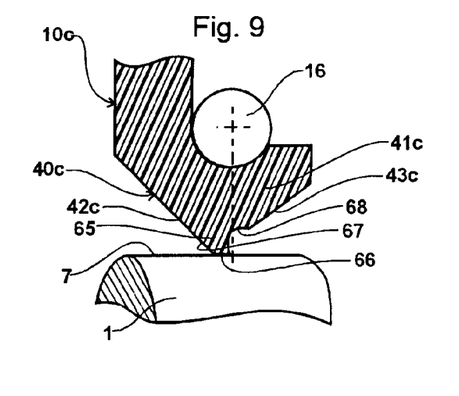

FIG. 9 illustrates a cross section a further exemplary embodiment of a seal 10c with a sealing lip 40c, according to the invention. As in the case of the preceding exemplary embodiments, sealing lip 40c has a main body element 41c which is defined essentially by two main side surfaces 42c and 43c tapering toward each other and has a generally triangular cross-sectional configuration and a projection 65 which is coupled to the point of main body element 41c. Projection 65 bears with a sealing-lip supporting surface 66 against opposite surface 7 of shaft 1.

Wedge-shaped projection 65 has a first side surface 67 which constitutes a continuous extension of the first main side surface 42c of main body element 41c. A second side surface 68 of projection 65, which surface is adjacent to the second main side surface 43c, is curved concavely inward, with the result that the width of projection 65, measured parallel to sealing-lip supporting surface 66 increases with increasing distance from sealing-lip supporting surface 66. However, this increase in width of projection 65 turns out to be substantially smaller than the increase in the width of main body element 41c defined by main side surfaces 42c and 43c.

Sealing-lip supporting surface 66 of seal 10c is enlarged slowly during abrasion of sealing lip 40c. The polishing or grinding in of sealing lip 40c can therefore also be achieved in this exemplary embodiment with a small structural outlay.

Figure 10:
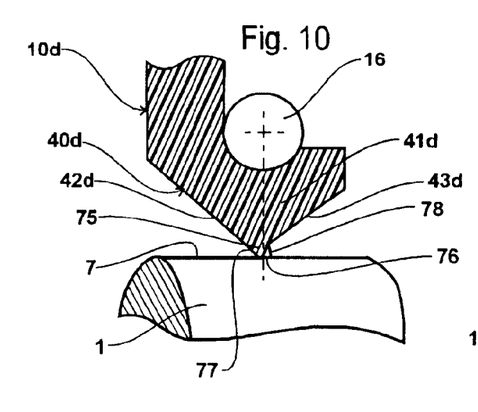

Referring now to FIG. 10, a projection 75 of a sealing lip 40d of a seal 10d, according to an aspect of the present invention, widens at a distance from a sealing-lip supporting surface 76 to a smaller extent than a main body element 41d of sealing lip 40d, which element is defined by two main side surfaces 42d and 43d.

Projection 75, which is of wedge-shaped design, is adjoined to main body element 41d of sealing lip 40d. A first side surface 77 of projection 75 forms the extension of main side surface 42d. A second side surface 78 of projection 75 is adjacent to second main side surface 43d at an angle. The relative angle between side surfaces 77 and 78 of projection 75 is more acute than the relative angle of main side surfaces 42d and 43d. Sealing-lip supporting surface 76 is enlarged slowly with abrasion of projection 57 in comparison to abrasion in the region of main body element 41d. The result is that the sealing effect of sealing lip 40d is retained over the service life.

Figure 11:
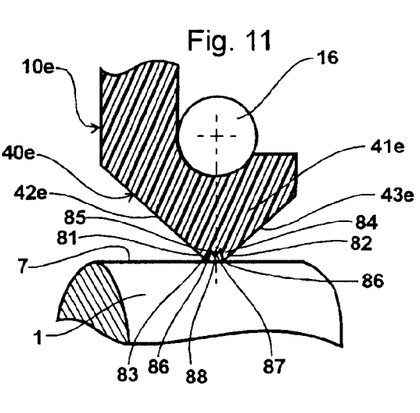

FIG. 11 illustrates an exemplary embodiment of a seal 10e, according to the invention, having a sealing lip 40e, in which embodiment two main side surfaces 42e and 43e define a main body element 41e and extend continuously from two initial sealing lips 83 and 84 of a projection 85 by means of two outer side surfaces 81 and 82.

The two initial sealing lips 83 and 84 bear against opposite surface 7 and together form an initial sealing-lip supporting surface 86. Between the two initial sealing lips 83 and 84, projection 85 has an additional sealing lip 87 with a narrow or sharp sealing-lip supporting surface 88. This additional sealing-lip supporting surface 88 is spaced apart from sealing-lip supporting surface 86.

Initially, only initial sealing lips 83 and 84 bear with sealing-lip supporting surface 86 on opposite surface 7 and are exposed there to the abrasion. The entire width of initial sealing lips 83 and 84 increases with increasing distance from initial sealing-lip supporting surface 86 to a smaller extent than the width of main body element 41e. When the two outer initial sealing lips 83 and 84 have ground shaft surface 7 smooth and have been worn, additional sealing lip 87 arranged between, them comes into use. The sharp-edged nature of sealing-lip supporting surface 88 of additional sealing lip 87 provides a higher surface pressure than at initial sealing lips 83 and 84. Since opposite surface 7 is ground smooth by outer initial sealing lips 83 and 84, the sharp-edged nature of additional sealing lip 87. Therefore, seal tightness of seal 10e is retained.

Figure 12:
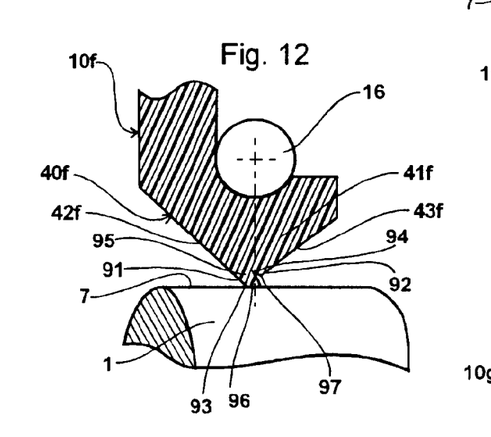

Yet, a further embodiment, illustrated in FIG. 12, of a seal 10f, according to the invention, having a sealing lip 40f has a main body element 41f, the main side surfaces 42f and 43f of which are extended continuously into two outer side surfaces 91 and 92 from an initial sealing lip 93 and an additional sealing lip 94 of a projection 95.

Initial sealing lip 93 has a wedge-shaped cross-sectional configuration similar to projection 75 of the sealing lip 40d of FIG. 10 and bears with an initial sealing-lip supporting surface 96 against opposite surface 7. Additional sealing lip 94 tapers in a pointed manner and has a sealing-lip supporting surface 97, which is spaced apart in the vertical direction from the initial sealing-lip supporting surface 96.

Additional sealing lip 94 does not initially come into contact with opposite surface 7. Only when projecting initial sealing lip 93 has been subjected to appropriate wear on opposite surface 7, by abrasion, does additional sealing lip 94 come to rest with its sharp sealing-lip supporting surface 97 against opposite surface 7 polished by initial sealing lip 93. The sharp-edged nature of additional sealing lip 94 ensures increased surface pressure. Because of the widely polished running surface on shaft surface 7, this sharp-edge provides a durable seal tightness of seal 10e.

Figure 13:
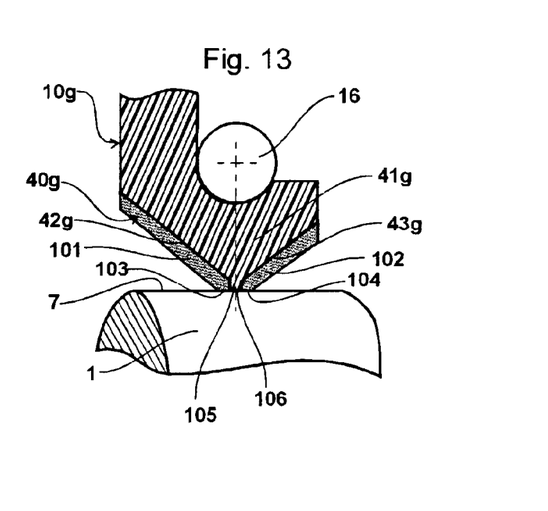

A sealing lip 40g, which is illustrated in FIG. 13, of a seal 10g, according to the invention, is formed with a main body part 41g having two main side surfaces 42g and 43g and a web-shaped projection 105 consisting of resilient sealing material. Furthermore, sealing lip 40g has two layers 101 and 102 consisting of a grinding material, which layers are arranged adjacent to main side surfaces 42g and 43g and butt against projection 105. Layers 101 and 102 rest with supporting surfaces 103 and 104 against opposite surface 7 parallel with and adjacent to a sealing-lip supporting surface 106 of projection 105.

The grinding material of layers 101 and 102 is particularly suitable for grinding opposite surface 7 smooth and therefore reduces the wear of sealing lip 40g by polishing of the running surface on opposite surface 7, particularly when there is axial play of shaft 1. The durability of seal 10g can therefore be significantly increased.

Of course, other sealing-lip forms may also be considered within the scope of the invention such as, for example, a different number of initial and additional sealing lips and a changed arrangement thereof as long as a maximum overall width of the projection essentially retains a required surface pressure and therefore seal tightness of the seal, and the sealing lip has sufficient stiffness, so that it does not move laterally.

Lateral movement can be avoided by at least one layer of a supporting material provided adjacent to the sealing-lip projection. The supporting material is preferably softer than the sealing-lip material and supports the sealing lip in the region of the projection against swinging laterally. Alternatively, both supporting material layers and grinding material layers can be provided.

As with the shape of the projection, various configurations can also be considered for the shape of the main body element such as, for example, a rectangular cross section of sufficient width or a rounded cross-sectional shape. In particular, the shape of the main body element has to be suitable for obtaining sufficient rigidity of the sealing lip and for ensuring a sufficient contact pressure force.

Although exemplary embodiments illustrate shaft seals, the invention may be used for different seals in which an axial and/or rotary relative movement between a sealing lip or sealing-lip supporting surface and an opposite surface occurs.

While several examples for carrying out the invention have been described, those familiar with the art to which this invention relates will recognize alternative designs and embodiments for practicing the invention. Thus, the above-described embodiments are intended to be illustrative of the invention, which may be modified within the scope of the following claims.

What is claimed is:

1. A shaft seal comprising:
   at least one sealing lip which bears with a sealing-lip supporting surface against an opposite surface moving relative to the seal at a predetermined surface pressure applied by a prestressing element, said sealing lip having a main body element and at least one projection, which is supported by and adjacent to said main body element, said projection bears against the opposite surface, said projection is a sacrificial element which abrades due to friction with said opposite surface and in the process polishes said opposite surface, the radial cross-sectional profile of said projection being such that said sealing-lip supporting surface is not substantially enlarged by abrasion thereby maintaining a predetermined surface pressure at said sealing-lip surface of said projection over a service life of the seal wherein said projection has, in the direction parallel to the sealing-lip supporting surface, at least one layer made of a grinding material.

2. The seal of claim 1, wherein said main body element and said projection are made of a single piece.

3. The seal of claim 1, wherein a radial extent of said projection is such that abrasion of said projection over the service life the seal essentially stops, due to a decrease in friction between said projection and said opposite surface on account of the increasingly more finely polished opposite surface.

4. The seal of claim 1 wherein a width of said projection increases at increasing distance from the opposite surface to a smaller extent than a width of said main body element increases at increasing distance from the opposite surface.

5. The seal of claim 1 wherein a width profile of the seal, said profile is a width of said lip measured parallel to an axis of the shaft as a function of a radial distance from said opposite surface, is substantially constant at increasing distance from said opposite surface and a width of said main body element increases at increasing distance.

6. The seal of claim 1, wherein a width profile of the seal, said profile is a width of said lip measured parallel to an axis of the shaft as a function of a radial distance from said opposite surface or decreases at increasing distance from said opposite surface and a width of said main body element increases at increasing distance.

7. The seal of claim 1 wherein said main body element has an essentially triangular cross-sectional configuration with two main side surfaces tapering toward said projection.

8. The said claim 1 wherein said sealing lip consists of essentially elastic or resilient sealing material.

9. A shaft seal comprising:
   at least one sealing lip which bears with a sealing-lip supporting surface against an opposite surface moving relative to the seal at a predetermined surface pressure applied by a prestressing element, said sealing lip having a main body element and at least one projection, which is supported by and adjacent to said main body element, said projection bears against the opposite surface, said projection is a sacrificial element which abrades due to friction with said opposite surface and in the process polishes said opposite surface, the radial cross-sectional profile of said projection being such that said sealing-lip supporting surface is not substantially enlarged by abrasion thereby maintaining a predetermined surface pressure at said sealing-lip surface of said projection over a service life of the seal further comprising: a supporting material in a direction parallel to said sealing-lip supporting surface and adjacent to at least said projection, said supporting material being softer than the sealing material in the region of the projection.

10. The seal of claim 9 wherein a radial extent of said projection is such that abrasion of said projection over the service life of the seal essentially stops, due to a decrease in friction between said projection and said opposite surface on account of the increasingly more finely polished opposite surface.

11. The seal of claim 9 wherein a width of said projection increases at increasing distance from the opposite surface to a smaller than a width of said main body element increases at increasing distance from the opposite surface.

12. The seal of claim 9, wherein a width profile of the seal, said profile is a width of said un measured parallel to an axis of the shaft as a function of a radial distance from said opposite surface, is substantially constant at increasing distance from said opposite surface and a width of said main body element increases at increasing distance.

13. The seal of claim 9, wherein a width profile of the seal, said profile is a width of said lip measured parallel to an axis of the shaft as a function of a radial distance from said opposite surface, or decreases at increasing distance from said opposite surface and a width of said main body element increases at increasing distance.

14. The seal of claim 9 wherein said main body element has an essentially triangular cross-sectional configuration with two main side surfaces tapering toward said projection.

15. The seal claim 9 wherein said sealing-lip consists of essentially elastic or resilient sealing material.

16. A shaft seal comprising:
   at least one sealing lip which bears with a sealing-lip supporting surface against an opposite surface moving relative to the seal at a predetermined surface pressure supplied by a prestressing element, said sealing lip having a main body element and at least one projection, which is supported by and adjacent to said main body element, said projection bears against the opposite surface, said projection is a sacrificial element which abrades due to friction with said opposite surface and in the process polishes said opposite surface, the radial cross-sectional profile of said projection being such that said sealing-lip supporting surface is not substantially enlarged by abrasion thereby maintaining a predetermined surface pressure at said sealing-lip surface of said projection over a service life of the seal wherein said projection further comprising at least one initial sealing lip with a supporting surface of said initial sealing-lip bearing against said opposite surface and at least one additional sealing lip with an additional sealing-lip supporting surface spaced apart from said apposite surface.

17. The seal of claim 16 wherein a width of said additional sealing lip, measured at a given distance parallel to the sealing-lip supporting surfaces is smaller than the overall width of said initial sealing lip at said given distance.

18. The seal of claim 16 further comprising at least two initial sealing lips, said at least one additional sealing lip is arranged between said at least two initial sealing lips.

* * * * *